US011923737B2

(12) United States Patent
Pederson et al.

(10) Patent No.: US 11,923,737 B2
(45) Date of Patent: Mar. 5, 2024

(54) FLYWHEEL SYSTEM WITH STATIONARY SHAFT (71) Applicant: MAERSK DRILLING A/S, Kgs. Lyngby (DK)

(72) Inventors: John Røn Pederson, Frederikssund (DK); Martin Speiermann, Hvidovre (DK); Jacopo Granata, Hvidovre (DK); Valère Combescot, Hvidovre (DK); Mikael Eronen, Hvidovre (DK)

(73) Assignee: WATTSUP POWER A/S, Hvidovre (DK)

( * ) Notice: Subject to any disclaimer, the term of this patent is extended or adjusted under 35 U.S.C. 154(b) by 262 days.

(21) Appl. No.: 17/287,483

(22) PCT Filed: Oct. 22, 2019

(86) PCT No.: PCT/DK2019/050319
§ 371 (c)(1),
(2) Date: Apr. 21, 2021

(87) PCT Pub. No.: WO2020/083452
PCT Pub. Date: Apr. 30, 2020

(65) Prior Publication Data
US 2021/0391778 A1 Dec. 16, 2021

Related U.S. Application Data (60) Provisional application No. 62/749,083, filed on Oct. 22, 2018.

(30) Foreign Application Priority Data

Oct. 22, 2018 (DK) .......................... PA 2018 00760
Nov. 15, 2018 (DK) .......................... PA 2018 00863

(51) Int. Cl.
H02K 21/22 (2006.01)
F16C 32/04 (2006.01)
(Continued)

(52) U.S. Cl.
CPC ........... *H02K 21/222* (2013.01); *H02K 7/025* (2013.01); *F16C 32/0427* (2013.01); *F16C 32/0474* (2013.01); *F16F 15/30* (2013.01)

(58) Field of Classification Search
CPC .......... H02K 21/22; H02K 7/02; H02K 7/025; H02K 21/222; H02K 2213/12; H02K 7/09;
(Continued)

(56) References Cited

U.S. PATENT DOCUMENTS 4,444,444 A * 4/1984 Benedetti ................. H02K 7/09
310/90.5
4,879,500 A * 11/1989 Kanemitsu .......... F16C 32/0489
318/632
(Continued)

FOREIGN PATENT DOCUMENTS

CN 101409478 * 4/2009
CN 101409478 B 5/2012
(Continued)

OTHER PUBLICATIONS

International Patent Application No. PCT/DK2019/050319, International Search Report and Written Opinion dated Jan. 22, 2020, 14 pgs.

*Primary Examiner* — Ahmed Elnakib
(74) *Attorney, Agent, or Firm* — Cozen O'Connor (57) ABSTRACT

A flywheel system includes a rotor and a fixture. The rotor forms an aperture. The fixture includes a bottom support, a top support, and a shaft connecting the bottom support to the top support. The shaft passes through the aperture. The
(Continued)

bottom support and the top support are outside opposite ends of the aperture. The rotor is configured to rotate about the shaft. A method for operating a flywheel system includes converting between rotational energy of a rotor and electrical energy in windings of a generator stator that is implemented in a stationary shaft passing through an aperture of the rotor, while the rotor is rotating about the shaft.

18 Claims, 9 Drawing Sheets

(51) Int. Cl.
*F16F 15/30* (2006.01)
*H02K 7/02* (2006.01)

(58) Field of Classification Search
CPC ............. H02K 2213/06; F16C 32/0427; F16C 32/0474; F16C 32/0476; F16C 32/048; F16F 15/30; Y02E 60/16
USPC ........................................................ 310/90.5
See application file for complete search history.

(56) References Cited

U.S. PATENT DOCUMENTS

| | | |
|---|---|---|
| 5,245,270 A | 9/1993 | Akiyama |
| 5,925,952 A | 7/1999 | Bichler et al. |
| 6,420,810 B1 | 7/2002 | Jeong |
| 2001/0015587 A1* | 8/2001 | Anma ................. H02K 21/222 310/156.12 |
| 2018/0034356 A1 | 2/2018 | Urch |
| 2020/0321843 A1* | 10/2020 | Røn Pedersen ........ H02K 11/21 |
| 2021/0372473 A1* | 12/2021 | Speiermann ........... H02K 7/025 |
| 2021/0391778 A1* | 12/2021 | Pederson ............. H02K 21/222 |

FOREIGN PATENT DOCUMENTS

| | | |
|---|---|---|
| CN | 105257698 A | 1/2016 |
| DE | 3205712 A1 | 8/1983 |
| EP | 0707754 A1 | 4/1996 |
| EP | 1878913 A1 | 1/2008 |
| GB | 2172752 A | 9/1986 |
| JP | H08178011 A | 7/1996 |
| JP | H08296645 A | 11/1996 |
| JP | 2002303257 | * 10/2002 |
| JP | 2002303257 A | 10/2002 |
| JP | 2005240963 A | 9/2005 |
| WO | WO 9502271 | * 1/1995 |
| WO | WO 2014/080165 A1 | 5/2014 |

* cited by examiner

FLYWHEEL SYSTEM WITH STATIONARY SHAFT

CROSS-REFERENCE TO RELATED APPLICATIONS

This application is a 35 U.S.C. § 371 filing of International Application No. PCT/DK2019/050319 filed Oct. 22, 2019, which claims the benefit of priority to U.S. Provisional Application No. 62/749,083, filed Oct. 22, 2018, Danish Patent Application No. PA 2018 00760 filed Oct. 22, 2018 and Danish Patent Application No. PA 2018 00863 filed Nov. 15, 2018, each of which is incorporated herein by reference in its entirety.

BACKGROUND

A flywheel system is a mechanical device that stores rotational energy in a rotating mass, i.e., a rotor. The amount of energy stored in the rotor is proportional to the square of the rotor's rotational speed. The rotor may be magnetically coupled with an electromagnetic generator stator to allow the flywheel system to convert between rotational energy of the rotor and electrical energy. The generator stator may decelerate the rotor to produce electrical energy from the rotational energy extracted from the rotor, and the generator stator may receive electrical energy and convert this electrical energy to rotational energy of the rotor resulting in acceleration of the rotor. Flywheel systems may be designed to have large energy storage capacity, and are further capable of both delivering and absorbing energy rapidly. Common uses of a flywheel system include (a) peak-shaving of the power output of another energy source such as a combustion generator stator, (b) energy storage, (c) backup power supply, and (d) rapid energy delivery.

Low-loss energy storage in a flywheel system requires that the rotor rotates with very little friction. Therefore, the rotor of a high-performance flywheel typically is magnetically levitated.

SUMMARY

In an embodiment, a flywheel system includes a rotor forming an aperture and a fixture including a bottom support, a top support, and a shaft connecting the bottom support to the top support. The shaft passes through the aperture. The bottom support and the top support are outside opposite ends of the aperture. The rotor is configured to rotate about the shaft.

In an embodiment, a method for operating a flywheel system includes converting between rotational energy of a rotor and electrical energy in windings of a generator stator that is implemented in a stationary shaft passing through an aperture of the rotor, while the rotor is rotating about the shaft.

DETAILED DESCRIPTION OF THE EMBODIMENTS

Flywheel systems are being considered for use in offshore or onshore environments not connected to a conventional electrical grid but instead relying on a so-called micro grid. In these environments, flywheel systems may serve as a source of energy and, for example, provide power functionalities such as energy storage, backup power, peak-shaving and/or frequency control. Flywheel systems may serve to rapidly meet a high, short-term power demand. When implemented in environments that are potentially unstable, such as onboard a drillship, a semisubmersible drilling platform, or another marine vessel, or in an earthquake-prone area, the flywheel system is subject to substantial forces which can affect both the performance and lifetime of the flywheel system.

Disclosed herein are flywheel systems configured with a rotor rotating about a stationary shaft. This configuration may offer several advantages over conventional flywheel systems with a rotating shaft rigidly coupled with the rotor, such as (a) stronger mechanical design leading to improved stability and elimination of stress concentration points, (b) increased interface region between the rotor and stationary parts allowing for improved optimization of the positioning of functional components, including access to more stable areas, and (c) balanced generator placement with symmetric torque application which reduces the amount of energy lost to active stabilization of the rotor as well as reduces stress on the flywheel system.

Figure 1:
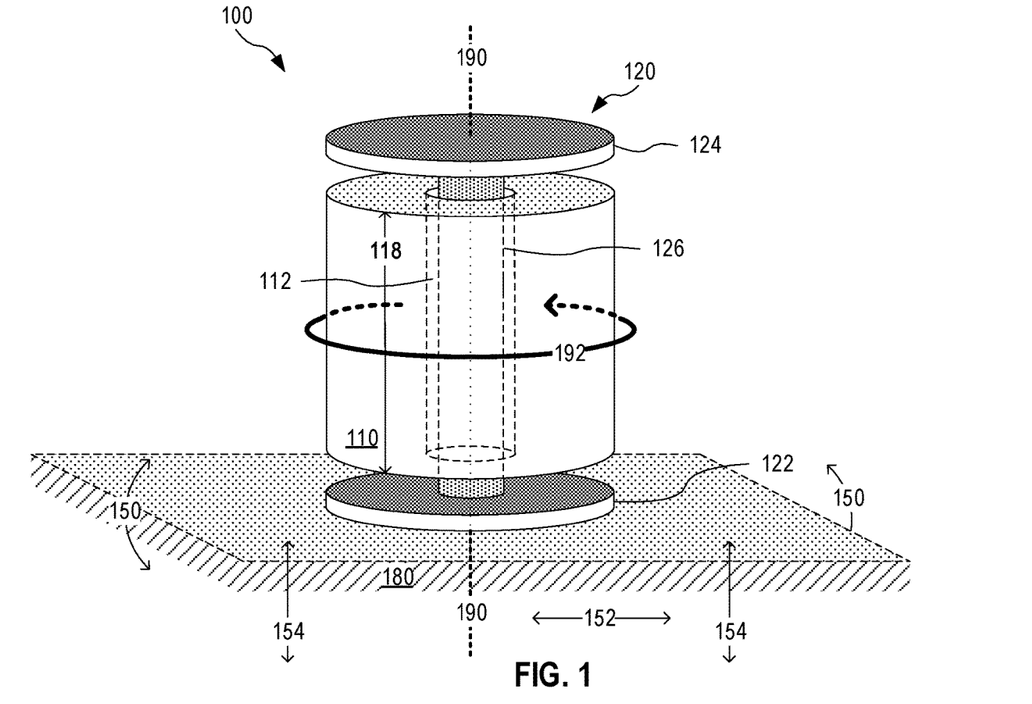
FIG. 1 illustrates a flywheel system, having a stationary shaft, in an exemplary use scenario, according to an embodiment.

FIG. 1 illustrates one flywheel system 100, having a stationary shaft, in an exemplary use scenario. Flywheel system 100 includes a rotor 110 and a fixture 120. Rotor 110 forms an aperture 112 that extends through the entire height 118 of rotor 110. Fixture 120 includes a bottom support 122, a top support 124, and a shaft 126 that connects bottom support 122 and top support 124. Shaft 126 is stationary with respect to bottom support 122 and top support 124. Shaft 126 passes through aperture 112, and rotor 110 rotates about shaft 126 as indicated by arrow 192 or in the direction opposite to arrow 192. Notably, the absence of rotor material in aperture 112 has relatively little impact on the energy capacity of rotor 110 because (a) aperture 112 is centrally located at rotation axis 190 and (b) the rotational energy of a mass element of rotor 110 scales with the square of the distance from the mass element to rotation axis 190.

In the scenario depicted in FIG. 1, fixture 120 is supported by a foundation 180, for example the floor of a building or a deck onboard a marine vessel. Fixture 120 is substantially rigidly coupled to foundation 180 and therefore moves with foundation 180 when foundation 180 moves. Foundation 180 may undergo movement in a variety of directions, for example horizontal translation as indicated by arrow 152, vertical translation as indicated by arrows 154, and rotation as indicated by 150, or a combination thereof.

Nominally, rotation axis 190 may coincide with a longitudinal axis of shaft 126. However, during operation, the rotation axis 190 may be tilted or translated relative to the longitudinal axis of shaft 126, for example in response to movement of foundation 180 or in response to forces applied to rotor 110 when accelerating or decelerating rotor 110. Herein, unless specified otherwise, the "rotation axis" of a rotor refers to the nominal rotation axis of the rotor, and it is understood that the actual rotation axis of the rotor may at least temporarily deviate from the nominal rotation axis.

The weight of rotor 110 may be between 10 and 10,000 kilograms. In one implementation configured for storage of relative large amounts of rotational energy in rotor 110, for example in a flywheel system 100 intended for use in offshore environments, the weight of rotor 110 is between 1 and 2 tons, such as 1.5 tons. In another implementation, configured for storage of smaller amounts of rotational energy in rotor 110, for example in a flywheel system 100 intended for household use, the weight of rotor 110 is between 10 and 100 kilograms.

Although FIG. 1 depicts each of rotor 110, aperture 112, and shaft 126 as being of cylindrical shape, the shape of any one of rotor 110, aperture 112, and shaft 126 may deviate from being cylindrical. For example, the surface of rotor 110 and shaft 126 facing each other may have recesses and/or protruding features to accommodate and position functional components that facilitate interaction between rotor 110 and shaft 126. Likewise, the shape of either one of bottom support 122 and top support 124 may be different from that shown in FIG. 1.

Herein, the "top" and "bottom" of a component of a flywheel system is referenced to a vertical rotation axis 190. It is understood that the flywheel systems disclosed herein may be oriented with a non-vertical rotation axis, for example prior to installation in an operating environment, or when the operating environment causes the orientation of a nominally vertical rotation axis to deviate from vertical (e.g., during movement and/or oscillation of the foundation supporting a flywheel system designed to operate with a generally vertical orientation axis). Similarly, the terms "above" and "below", as used herein, are referenced to the rotation axis.

Figure 2:
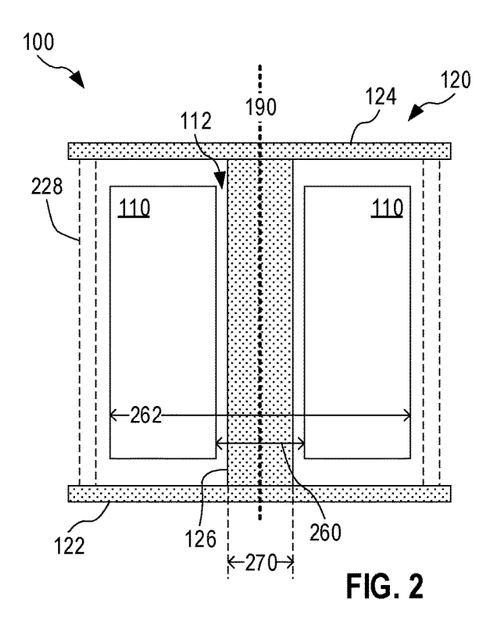
FIG. 2 is a cross-sectional view of the flywheel system of FIG. 1.

FIG. 2 is a cross-sectional view of flywheel system 100. Aperture 112 has a transverse extent 260, rotor 110 has transverse extent 262, and shaft 126 has transverse extent 270. In one embodiment, each of transverse extents 260, 262, and 270 is constant along rotation axis 190. In another embodiment, one, two, or all of transverse extents 260, 262, and 270 varies as a function of the position along the rotation axis, for example as discussed above in reference to FIG. 1. Each of transverse extents 260, 262, and 270 may be a diameter. The difference between transverse extent 270 and 260 may be in the range between one and 20 millimeters. The ratio of transverse extent 260 to transverse extent 262 may be in the range between 5 and 50 percent. Each of transverse extent 262 and height 118 may be in the range between 10 and 200 centimeters. Transverse extent 270 may be in the range between 3 and 100 millimeters. Shaft 126 may include steel or be made of steel, such as stainless steel.

Fixture 120 may further include a radial wall 228 that cooperates with bottom support 122 and top support 124 to form an enclosure that contains rotor 110. This enclosure may be a vacuum enclosure.

Figure 3:
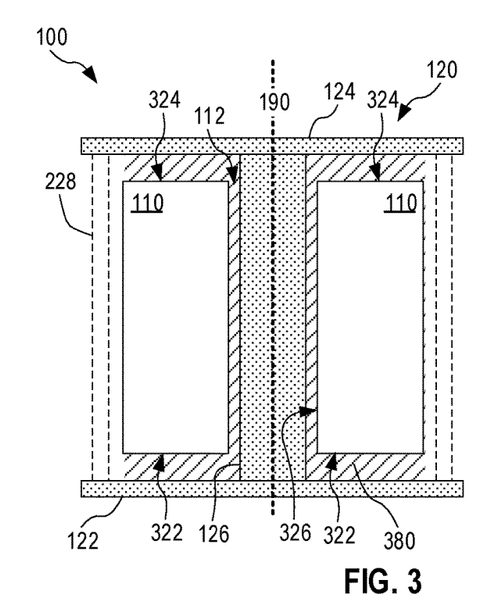
FIG. 3 illustrates an interface region of the flywheel system of FIG. 1 that may accommodate functional components facilitating interaction between a rotor and a fixture of the flywheel system, according to an embodiment.

FIG. 3 illustrates an interface region of flywheel system 100 that may accommodate functional components that facilitate interaction between rotor 110 and fixture 120. Such functional components may include (a) one or more generator modules that magnetically convert rotational energy of the rotor to an electrical energy output of the flywheel system and, conversely, magnetically converting an electrical energy input to the flywheel system to rotational energy of the rotor, (b) one or more passive magnetic bearing modules that levitate the rotor in the fixture, and/or (c) one or more active magnetic bearing modules that stabilize the position of the rotor relative to the fixture. The active magnetic bearing module(s) may be accompanied by one or more passive "touch-down" magnetic bearing modules that provides stabilization of the rotor in the event of failure of the active magnetic bearing modules. Herein, an "active magnetic bearing module" refers to a bearing that is adjustable based upon an input signal. An active magnetic bearing module may include one or more sensors in a feedback loop.

By virtue of aperture 112 spanning the entire height 118 of rotor 110 and stationary shaft 126 passing through the entire height of aperture 112, flywheel system 100 offers a relatively large and spread-out interface region 380 between rotor 110 and fixture 120, as compared to flywheel systems having a rotating shaft. Interface region 380 includes the space between bottom support 122 and a bottom surface 322 of rotor 110, the space between top support 124 and a top surface 324 of rotor 110, and the space in aperture 112 between shaft 126 and an inward-facing surface 326 of rotor. This relatively large and spread-out interface region 380 enables relatively large distances between different magnetic components implemented in flywheel 100, such that the different magnetic components may be positioned to minimize potential magnetic coupling between such different magnetic components. For example, in a conventional flywheel system configured with a rotating shaft and a more compact interface region between the rotor and stationary parts, it may be necessary to incorporate special materials to shield one magnetic component from another magnetic component in close proximity thereto. The configuration of interface region 380 of flywheel system 100 may reduce or eliminate the need for such shielding.

A significant benefit of the stationary-shaft configuration of flywheel system 100 is the elimination of certain structural points where stresses otherwise may concentrate and cause instability and possibly even damage to the flywheel system.

Figure 4:
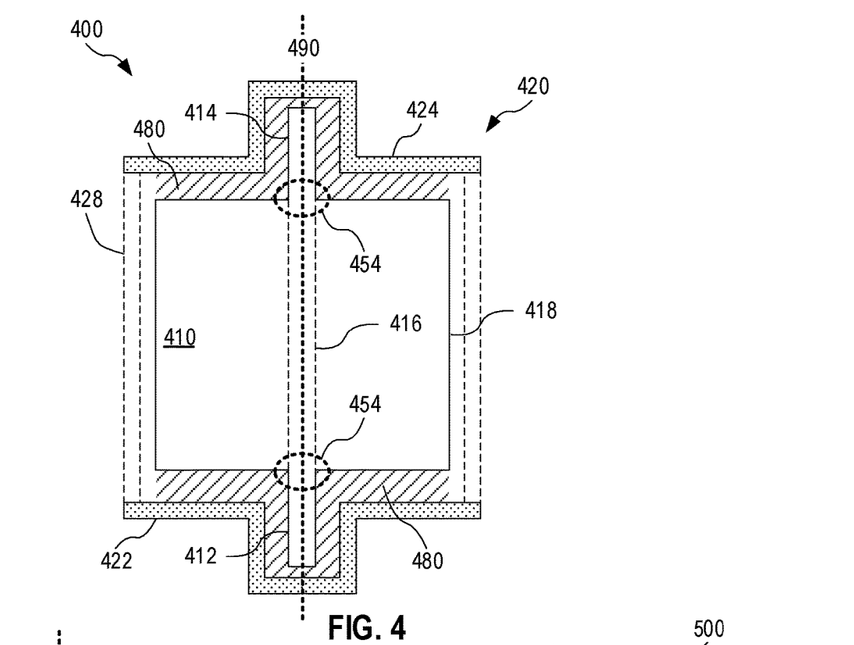
FIG. 4 shows a flywheel system with a rotating shaft.

FIG. 4 shows a flywheel system 400 with a rotating shaft. Flywheel system 400 includes a rotor 410 and a fixture 420 that supports rotor 410. Rotor 410 includes a rotor body 418 and, rigidly connected therewith, a bottom shaft portion 412 and a top shaft portion 414. Shaft portions 412 and 414 may be connected to each other via a central shaft portion 416, shaft portions 412 and 414 may be mechanically coupled to rotor body 418, or shaft portions 412 and 414 may be integrally formed with at least a part of rotor body 418. Fixture 420 includes a bottom support 422 and a top support 424. Fixture 420 may further include a radial wall 428. Functional components for facilitating interaction with rotor 410 may be positioned in an interface region 480.

In one implementation, shaft portions 412 and 414 are long to maximize interface region 480. However, in this implementation, a structurally weak point 454 will exist at each of the junction between bottom shaft portion 412 and rotor body 418 and the junction between top shaft portion 414 and rotor body 418. During operation of flywheel system 400, stresses to rotor 410 concentrate at structurally weak points 454. Structurally weak points 454 effectively limit the safe rotation speed of rotor 410 as well as the safe torque that may be applied to rotor 410 to, e.g., exchange energy therewith or stabilize position thereof.

In another implementation, shaft portions 412 and 414 are short to reduce the stress concentration at structurally weak points 454. However, in this implementation, interface region 480 is reduced.

Referring again to flywheel system 100 of FIGS. 1, 2, and 3, structurally weak points 454 are eliminated through use of stationary shaft 126 and the shape of rotor 110 with aperture 112. This configuration of flywheel 100 does not sacrifice the size of the interface region between rotating and stationary parts. To the contrary, the configuration of flywheel system 100 offers a large interface region 380.

Figure 5:
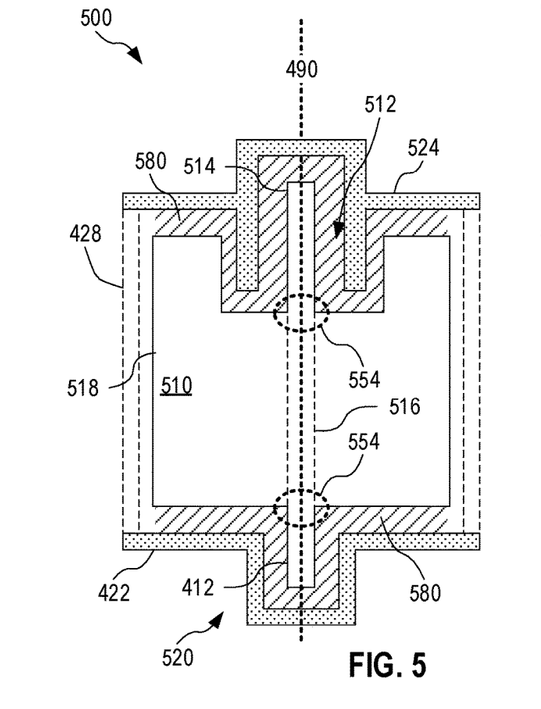
FIG. 5 shows another flywheel system with a rotating shaft.

FIG. 5 shows another flywheel system 500 with a rotating shaft. Flywheel system 500 includes a rotor 510 and a fixture 520 that supports rotor 510. Rotor 510 includes a rotor body 518 and, rigidly connected therewith, bottom shaft portion 412 and a top shaft portion 514. Top shaft portion 514 is connected with rotor body 518 in a recess 512 of rotor body 518. Shaft portions 412 and 514 may be connected to each other via a central shaft portion 516, shaft portions 412 and 514 may be mechanically coupled to rotor body 518, or shaft portions 412 and 514 may be integrally formed with at least a part of rotor body 518. Fixture 520 includes bottom support 422 and a top support 524. Fixture 520 may further include radial wall 428. Functional components for facilitating interaction with rotor 510 may be positioned in an interface region 580.

As compared to flywheel system 100, flywheel system 500 has drawbacks similar to those discussed above in reference to flywheel system 400. Flywheel system 500 is subject to a similar tradeoff between limiting stress at structurally weak points 554 and optimizing the size of interface region 580.

Figure 6:
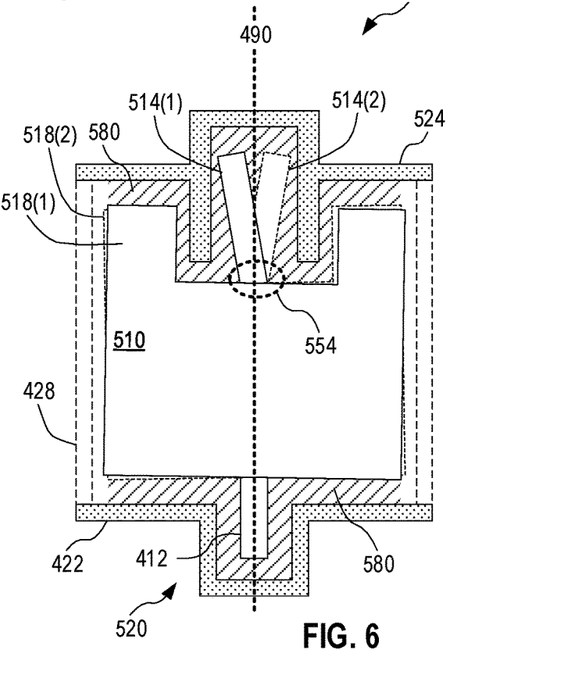
FIG. 6 illustrates one type of structural instability that may arise during operation of the flywheel system of FIG. 5.

FIG. 6 illustrates one type of structural instability that may arise during operation of flywheel system 500. In this scenario, the rotation of rotor body 518 is slightly unstable and rotor body 518 gyrates about the nominal rotation axis 490, as indicated in FIG. 6 by two different positions 518(1) and 518(2) of rotor body 518. Since the junction of top shaft portion 514 and rotor body 518 is a structurally weak point 554, this slight instability of rotor body 518 may, especially at high rotation speed, be accompanied by a more extreme gyration or other instability of upper shaft portion 514, as indicated in FIG. 6 by two positions 514(1) and 514(2) of shaft portion 514.

Referring again to flywheel system 100 of FIGS. 1, 2, and 3, flywheel system 100 does not have rotating shaft portions and the associated structurally weak points. Thus, instability of the rotation of rotor 110 does not result in extreme instability of other rotating parts. In addition, stationary shaft 126 is secured to both bottom support 122 and top support 124, which greatly reduces the risk and severity of instability of stationary shaft 126.

Figure 7A:
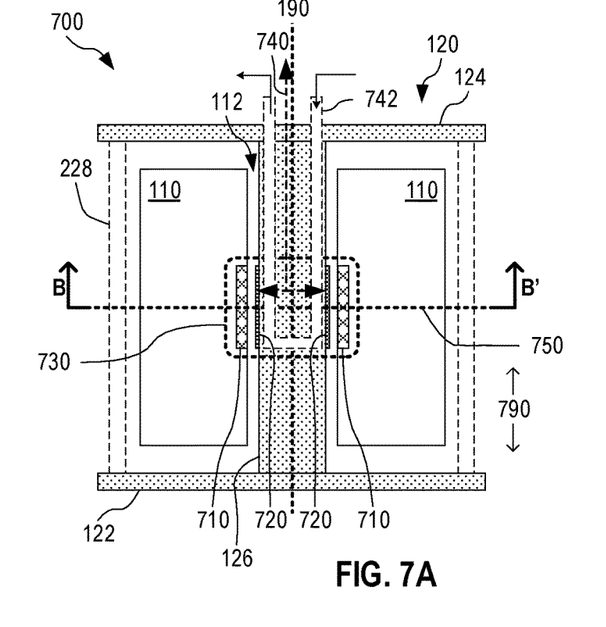
FIGS. 7A and 7B illustrate one flywheel system having a stationary shaft and balanced generator configuration, according to an embodiment.
Figure 7B:
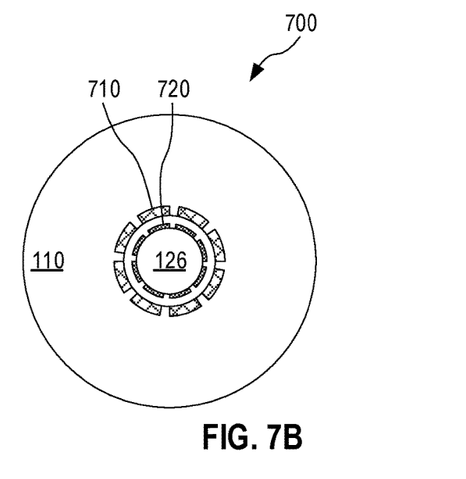

FIGS. 7A and 7B illustrate one flywheel system 700 having a stationary shaft and balanced generator configuration. Flywheel system 700 is an embodiment of flywheel system 100. FIG. 7A is a cross-sectional side view of flywheel system 700, taken in the plane of rotation axis 190. FIG. 7B is a cross-sectional top view of flywheel system 700, taken in a plane orthogonal to rotation axis 190, as indicated by line B-B' in FIG. 7A. FIGS. 7A and 7B are best viewed together in the following description.

In addition to rotor 110 and fixture 120, flywheel system 700 includes a generator module 730 configured to magnetically convert rotational energy of rotor 110 to an electrical energy output of flywheel system 100 and, conversely, magnetically convert an electrical energy input to flywheel system 100 to rotational energy of rotor 110. Generator module 730 includes a plurality of permanent magnets 710 mechanically coupled with rotor 110 and a plurality of electromagnets 720 mechanically coupled with stationary shaft 126. Each electromagnet 720 includes one or more windings that may be wrapped around a soft magnetic core, such as an iron alloy core. As shown in FIG. 7B, permanent magnets 710 and electromagnets 720 may be disposed at different azimuthal positions about rotation axis 190. Without departing from the scope hereof, the number of permanent magnets 710 and the number of electromagnets 720 may be different from that shown in FIG. 7B.

When active, electromagnets 720 magnetically couple with permanent magnets. This magnetic coupling allows for conversion between electric energy and rotational energy. In a so-called generator mode, generator module 730 outputs, to an external load, an electric current generated in the windings of electromagnets 720 by decelerating the rotation of rotor 110, so as to convert rotational energy of rotor 110 to electric energy. In a so-called motor mode, generator module 730 uses electric current, supplied by an external source to the windings of electromagnets 720, to accelerate the rotation of rotor 110, so as to convert inputted electrical energy to rotational energy of rotor 110. Electric current may be supplied to or extracted from the windings of electromagnets 720 via one or more cables 740 disposed on or in stationary shaft 126. Stationary shaft 126 may also accommodate a liquid cooling circuit 742 that cools electromagnets 720.

Rotor 110 has a mid-plane 750 that is orthogonal to rotation axis 190 and coincides with the center-of-mass of rotor 110. When exchanging energy with rotor 110, electromagnets 720 apply a torque to rotor 110 via magnetic coupling with permanent magnets 710. The torque thus applied by generator module 730 to rotor 110 is balanced with respect to a mid-plane 750 of rotor 110, such that the torque does not tilt rotor 110 relative to its nominal rotation axis. In an embodiment, the magnetic field generated by electromagnets 720 is symmetric with respect to mid-plane 750. For example, the windings of electromagnets 720 may be centered at mid-plane 750.

As illustrated by specific examples in FIGS. 8 and 9 (discussed below), flywheel system 700 may, without departing from the scope hereof, include two or generator modules 730 that are cooperatively configured to apply a torque that is balanced with respect to mid-plane 750.

Figure 8:
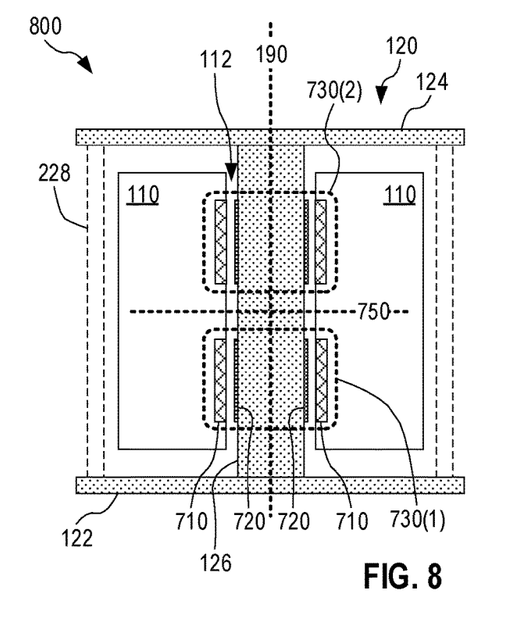
FIG. 8 illustrates another flywheel system having a stationary shaft and balanced generator configuration, according to an embodiment.
Figure 9:
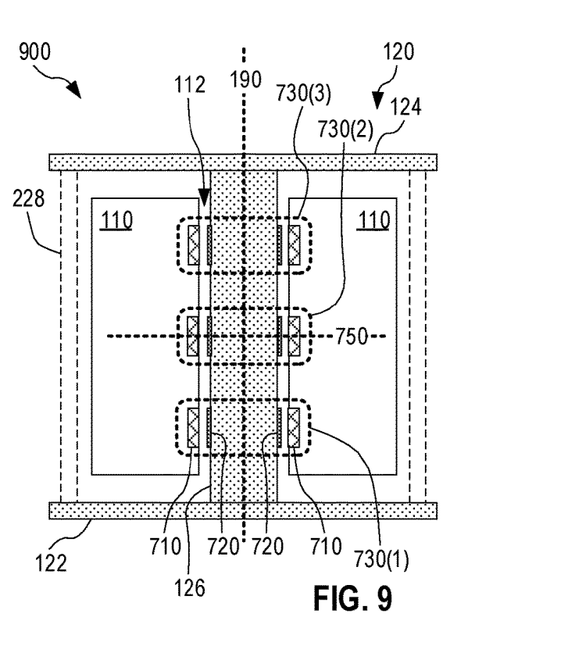
FIG. 9 illustrates yet another flywheel system having a stationary shaft and balanced generator configuration, according to an embodiment.

The balanced generator configuration in flywheel system 700 (and its balanced multi-generator module modifications, such as those shown in FIGS. 8 and 9) reduces active corrections needed to stabilize rotor 110. Since active correction consumes power, active correction ultimately reduces the energy efficiency of a flywheel system. For example, an unbalanced flywheel system having a single generator module positioned near one end of the rotor, as is generally the case in conventional flywheel systems with a rotating shaft, may spend 3-5 percent per 24 hours of the stored rotational energy to compensate for asymmetric torque application during active use of the flywheel system 100. In certain implementations, the rate of rotational energy loss from flywheel system 700 may be less than about one percent per 24 hours.

Without departing from the scope hereof, flywheel system 700 may be deviate somewhat from having perfectly balanced torque application, for example by fifteen percent. In one embodiment, electromagnets 720 are symmetric about mid-plane 750 to within fifteen percent in the axial dimension (indicated by arrow 790 in FIG. 7A).

FIG. 8 illustrates another flywheel system 800 having a stationary shaft and balanced generator configuration. Flywheel system 800 an embodiment of flywheel system 700 that has two generator modules 730 symmetrically positioned with respect to mid-plane 750, at least to within fifteen percent. The symmetric placement of generator modules 730 in flywheel system 800 ensures balanced torque application, as discussed above for flywheel system 700.

It is understood that flywheel system 800 may include one or both of cable(s) 740 and liquid cooling circuit 742 although, for clarity of illustration, these elements are omitted in FIG. 8.

FIG. 9 illustrates yet another flywheel system 900 having a stationary shaft and balanced generator configuration. Flywheel system 900 is an embodiment of flywheel system 700 that has three generator modules 730 symmetrically positioned with respect to mid-plane 750. One generator module 730 is centered at mid-plane 750, and the other two generator modules 730 are positioned symmetrically above and below mid-plane 750, at least to within fifteen percent. The symmetric placement of generator modules 730 in flywheel system 900 ensures balanced torque application, as discussed above for flywheel system 700.

It is understood that flywheel system 900 may include one or both of cable(s) 740 and liquid cooling circuit 742 although, for clarity of illustration, these elements are omitted in FIG. 9.

It is understood that flywheel system 100 may implement one or more generator modules 730 in a non-balanced fashion.

Figure 10:
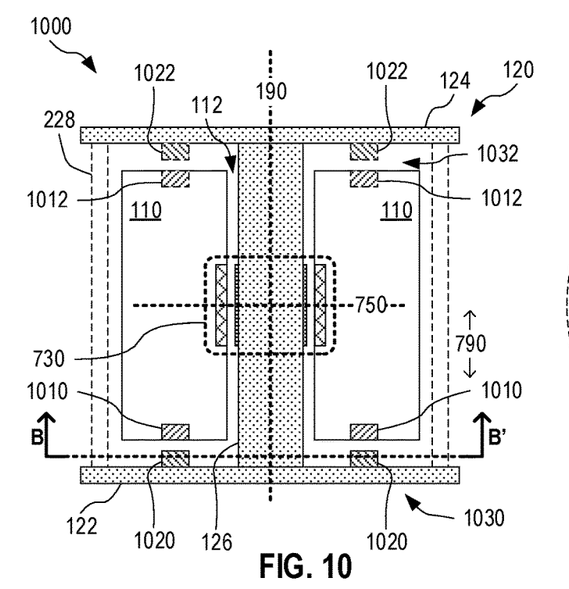
FIG. 10 illustrates one flywheel system having a stationary shaft and at least one magnetic levitation module, according to an embodiment.

FIG. 10 illustrates one flywheel system 1000 having a stationary shaft and at least one magnetic levitation module. Flywheel system 1000 is an embodiment of flywheel system 100. Flywheel system 1000 may also be an embodiment of flywheel system 700. Flywheel system 1000 may be configured to operate with a nominally vertical rotation axis 190. Flywheel system 1000 includes rotor 110, fixture 120, and one or more generator modules 730. Flywheel system 1000 may implement generator module(s) in a balanced configuration as discussed above in reference to FIGS. 7-9. Flywheel system 1000 further includes (a) a plurality of magnets 1010 mechanically coupled to rotor 110 at its bottom end and (b) a plurality of magnets 1020 mechanically coupled to bottom support 122. Magnets 1010 and magnets 1020 repel each other and thus cooperate to form a bottom magnetic levitation module 1030 that levitates rotor 110 above bottom support 122. Magnets 1010 and 1020 may cooperate to bear the gravitational load of rotor 110. Magnets 1010 and 1020 may also at least partly counteract relative movement of rotor 110 toward bottom support 122, for example when induced by movement of foundation 180. One or both of magnets 1010 and 1020 may be or may include a set of permanent magnets. Magnets 1010 and 1020 may be configured to passively couple with each other, with no use of active feedback. Alternatively, magnets 1020 may be active and operate according to an active feedback signal, and cooperate with passive magnets 1010 to form an active magnetic levitation bearing.

In certain embodiments, flywheel system 1000 further includes (a) a plurality of magnets 1012 mechanically coupled to rotor 110 at its top end and (b) a plurality of magnets 1022 mechanically coupled to top support 124. Magnets 1012 and magnets 1022 repel each other and thus cooperate to form a top magnetic levitation module 1032 that limit upwards movement of rotor 110 toward top support 124, for example when induced by movement of foundation 180. One or both of magnets 1012 and 1022 may be or may include a set of permanent magnets. Magnets 1012 and 1022 may be configured to passively couple with each other, with no use of active feedback. Alternatively, magnets 1022 may be active and operate according to an active feedback signal, and cooperate with passive magnets 1012 to form an active magnetic levitation bearing.

Bottom magnetic levitation module 1030 serves to stabilize the position of rotor 110 in the axial dimension (corresponding to arrow 790). When implemented in flywheel system 1000, top magnetic levitation module 1032 further contributes to such stabilization. The large and spread-out interface region 380, associated with the stationary shaft configuration of flywheel system 1000, allows for placement of each of bottom magnetic levitation module 1030 and top magnetic levitation module 1032 relatively far from generator module(s) 730, such that magnetic fields from generator module(s) 730 have little or no impact on the performance of bottom magnetic levitation module 1030 and top magnetic levitation module 1032. For comparison, in conventional flywheel systems, where a generator may need to be in relatively close proximity to levitation magnets, magnetic shielding may be needed to prevent the operation of the generator from affecting the stability of the rotor, especially if the levitation magnets are passive. Such shielding may add significant cost. In contrast, flywheel system 1000 may require less shielding or none at all.

Figure 11:
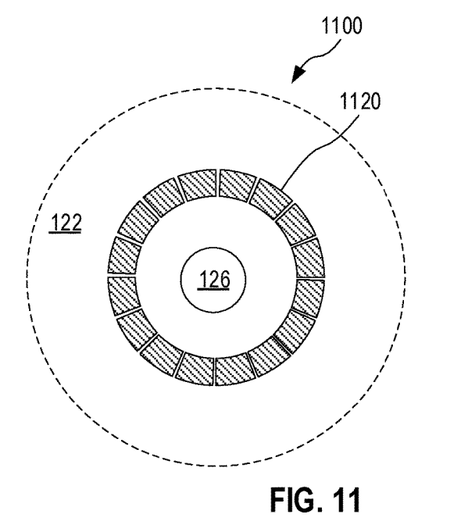
FIG. 11 illustrates one configuration of magnets of the flywheel system of FIG. 10, according to an embodiment.

FIG. 11 illustrates one configuration 1100 of magnets 1120. The view depicted in FIG. 11 corresponds to a cross-sectional top view along line B-B' in FIG. 10. Magnets 1120, configured according to configuration 1100, form an embodiment of magnets 1020 of flywheel system 1000. Magnets 1120 are arranged in a circle around shaft 126. The size, shape, and number of magnets 1120 in configuration 1100 may deviate from that depicted in FIG. 11, without departing from the scope hereof.

Referring now to FIGS. 10 and 11 in combination, magnets 1010 of flywheel system 1000 may also be arranged according to configuration 1100. The configuration of magnets 1010 may be the same as or different from the configuration of magnets 1020. Similarly, one or both of magnets 1012 and 1022 may be arranged according to configuration 1100.

Figure 12:
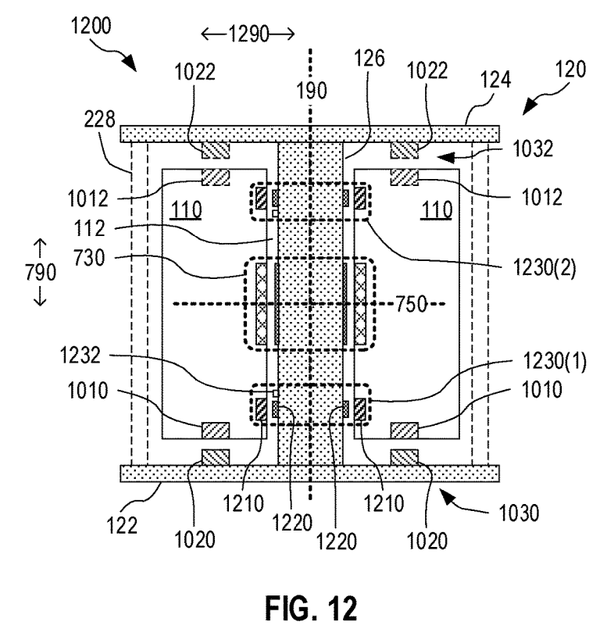
FIG. 12 illustrates one flywheel system having a stationary shaft, at least one magnetic levitation module, as well as transverse stabilization, according to an embodiment.

FIG. 12 illustrates one flywheel system 1200 having a stationary shaft, at least one magnetic levitation module, as well as transverse stabilization. Flywheel system 1200 is an embodiment of flywheel system 1000 that further includes active magnetic bearing modules 1230(1) and 1230(2). Each active magnetic bearing module 1230 actively stabilizes the position of rotor 110 in the dimensions 1290 transverse to rotation axis 190, including the dimensions corresponding to a tilt of rotor 110 away from its nominal rotation axis 190. Active magnetic bearing modules 1230(1) and 1230(2) are positioned in aperture 112 closer to bottom support 122 and top support 124, respectively.

In an embodiment, each active magnetic bearing module 1230 includes (a) a plurality of magnetizable elements 1210 mechanically coupled with rotor 110, and (b) a plurality of electromagnets 1220 mechanically coupled with stationary shaft 126. Electromagnets 1220 actively magnetically couple with magnetizable elements 1210 to stabilize rotor 110. Each magnetizable element 1210 may be a soft magnetic composite, a stack of laminated transformer steel, a stack of non-oriented electrical steel, or a magnetic material with intrinsic coercivity less than 1000 Ampere/meter. Each electromagnet 1220 may be include a coil, optionally wrapped around a soft magnetic core such as a soft iron core.

Each active magnetic bearing module 1230 may further include one or more sensors 1232. Sensor(s) 1232 senses at least one of position and motion of rotor 110 to generate an active feedback signal to electromagnets 1220, based upon which electromagnets 1220 adjust their magnetic field to stabilize rotor 110. Sensor(s) 1232 may be positioned in close proximity to electromagnets 1220 (as shown in FIG. 12) or further away from electromagnets 1220. Placement of sensor(s) 1232 on stationary shaft 126 is a significant advantage of the stationary-shaft configuration of flywheel system 1200. In comparison to flywheel systems having a rotating shaft and associated structurally weak points (as discussed above in reference to FIGS. 4-6), stationary shaft 126 provides a more stable platform for sensor(s) 1232 and, thus, improved accuracy of feedback signals generated by sensor(s) 1232. For example, a sensor on an unstable top shaft portion 514 (as depicted in FIG. 6) would provide feedback signals of little relevance to stabilization of rotor body 518.

Figure 13:
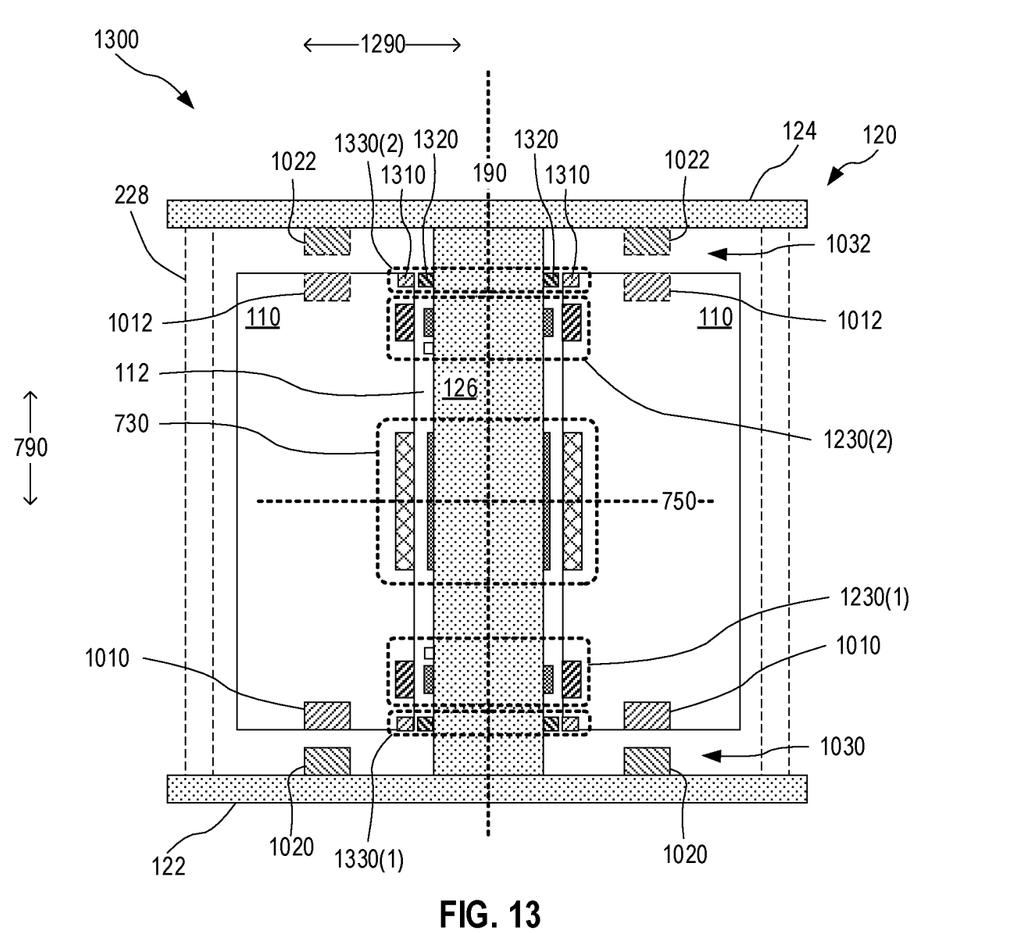
FIG. 13 illustrates one flywheel system having a stationary shaft and several magnetic bearing modules including a touch-down magnetic bearing module, according to an embodiment.

FIG. 13 illustrates one flywheel system 1300 having a stationary shaft and several magnetic bearing modules including a touch-down magnetic bearing module. Flywheel system 1300 is an embodiment flywheel system 1200 that further includes touch-down magnetic bearing modules 1330(1) and 1330(2), positioned at or near the bottom end and top end, respectively, of rotor 110. Touch-down magnetic bearing modules 1330 provides backup stabilization of rotor 110 in the event of failure of one or both of active magnetic bearing modules 1230. Failure of an active magnetic bearing module 1230 may occur if one or more of sensor(s) 1232 and electromagnets 1220 loses power, or if rotor 110 deviates from its nominal position to a degree that is not correctable by active magnetic bearing modules 1230. The backup stabilization provided by touch-down magnetic bearing modules 1330 may be sufficient to prevent catastrophic damage of flywheel system 1300 and, for example, safely stabilize rotor 110 during deceleration to a standstill.

Each touch-down magnetic bearing module 1330 is a passive magnetic bearing, so as to ensure the functionality of touch-down magnetic bearing module 1330 regardless of whether or not electric power is available. Each touch-down magnetic bearing module 1330 includes (a) a plurality of permanent magnets 1310 mechanically coupled with rotor 110 and (b) a plurality of permanent magnets 1320 mechanically coupled with stationary shaft 126. Permanent magnets 1310 and permanent magnets 1320 repel each other in such as manner as to prevent, at least in most scenarios, rotor 110 (and any component affixed thereto) from coming into contact with either one of electromagnets 720 of generator(s) 730 and electromagnets 1220 of active magnetic bearing modules 1230. In one implementation, active magnetic bearing modules 1230 are capable of stabilizing rotor 110 in a certain range about its nominal position, and touch-down magnetic bearing modules 1330 engage near the limits of this range or somewhat within this range. In one example, active magnetic bearing modules 1230 are capable of stabilizing rotor 110 in a ±2 millimeter range about its nominal position, and touch-down magnetic bearing modules 1330 are configured to engage at least when the deviation of the position of rotor 110 from its nominal position growths to 1.5 millimeters.

The reliability and accuracy of touch-down magnetic bearing modules 1330 is improved when not affected by other magnetic fields. Generally, a passive magnetic bearing module may be more accurate and reliable when not affected by external magnetic fields. Whereas an active magnetic bearing module may be adjusted, and even adjust itself automatically, in response to changes in magnetic fields from other magnetic field sources, a passive magnetic bearing module does not have such capability. The large and spread-out interface region 380 of the stationary-shaft configuration of flywheel system 1300 allows for placement of touch-down magnetic bearing modules 1330 relatively far from the permanent magnets of bottom magnetic levitation module 1030, optional top magnetic levitation module 1032, and generator(s) 730, as well as from electromagnetically generated magnetic fields of generator(s) 730. This reduces or eliminates the need for magnetic shielding of touch-down magnetic bearing modules 1330. Similarly, magnetic levitation module 1030, and optional top magnetic levitation module 1032, may benefit from the large distance to other permanent magnets.

Figure 14:
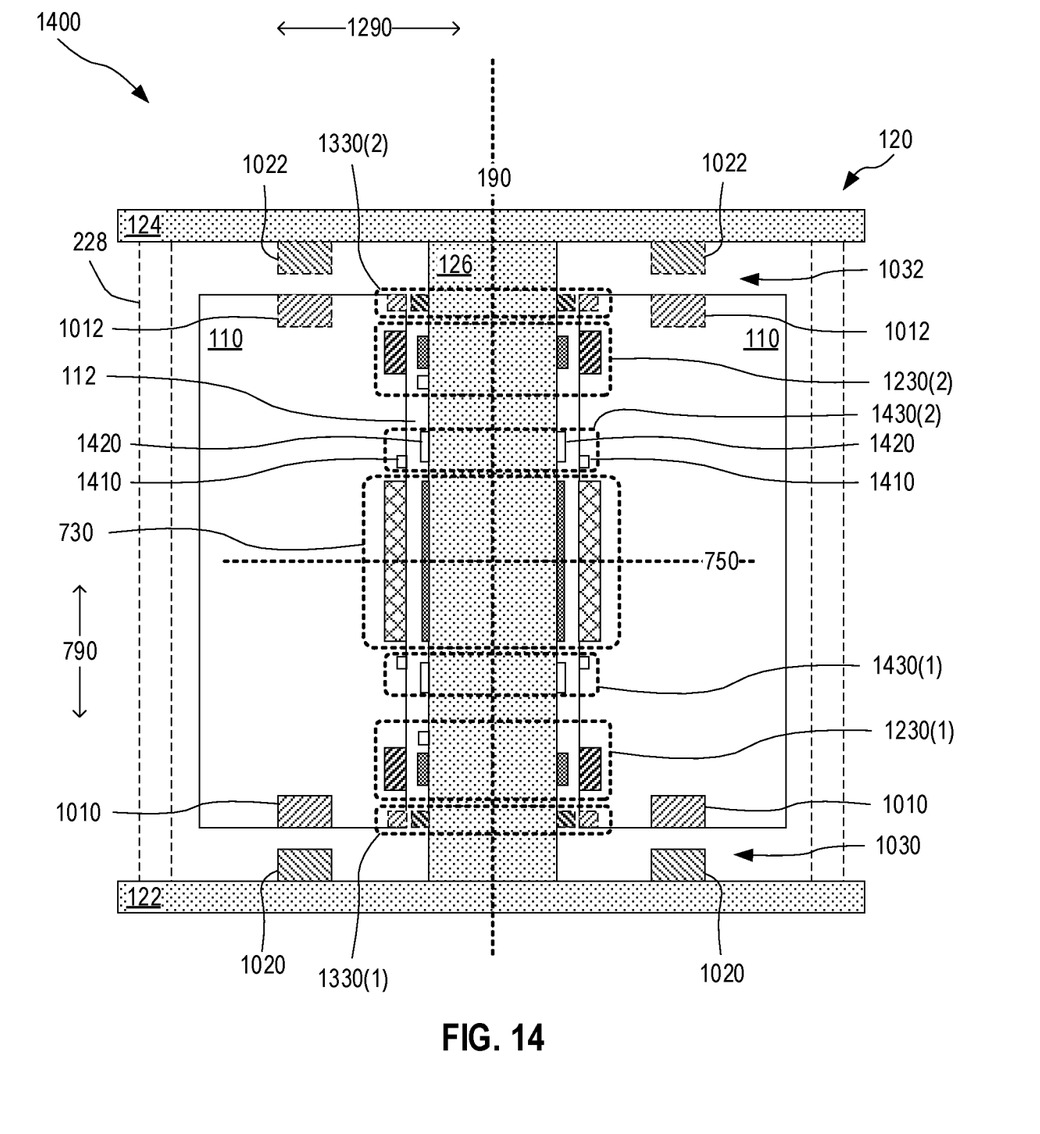
FIG. 14 illustrates one flywheel system having a stationary shaft and active stabilization of both the transverse and axial position of rotor, according to an embodiment.

FIG. 14 illustrates one flywheel system 1400 having a stationary shaft and active stabilization of both the transverse and axial position of rotor 110. Flywheel system 1400 is an embodiment flywheel system 1200 that further includes at least one active axial stabilization module 1430. Flywheel system 1400 may include two active axial stabilization modules 1430(1) and 1430(2) positioned below and above mid-plane 750 of rotor 110. Flywheel system 1400 may further include touch-down magnetic bearing modules 1330(1) and 1330(2). Each active axial stabilization modules 1430 actively stabilizes the position of rotor 110 in the axial dimension (indicated by arrow 790 in FIG. 14)

In an embodiment, each active axial stabilization modules 1430 includes (a) a plurality of magnets (or magnetizable elements) 1410 mechanically coupled with rotor 110, and (b) at least one electromagnet 1420 mechanically coupled with stationary shaft 126. Each electromagnet 1420 may be a coil wrapped around stationary shaft 126. Each magnet 1410 may be a permanent magnet. Without departing from the scope hereof, a portion of permanent magnets 710 may function as magnets 1410. Electromagnets 1420 actively magnetically couple with magnets 1410 to stabilize rotor 110. Each active axial stabilization modules 1430 may further include one or more sensors (not shown in FIG. 14)

that sense at least one of position and motion of rotor 110 to generate an active feedback signal to electromagnets 1420.

Figure 15:
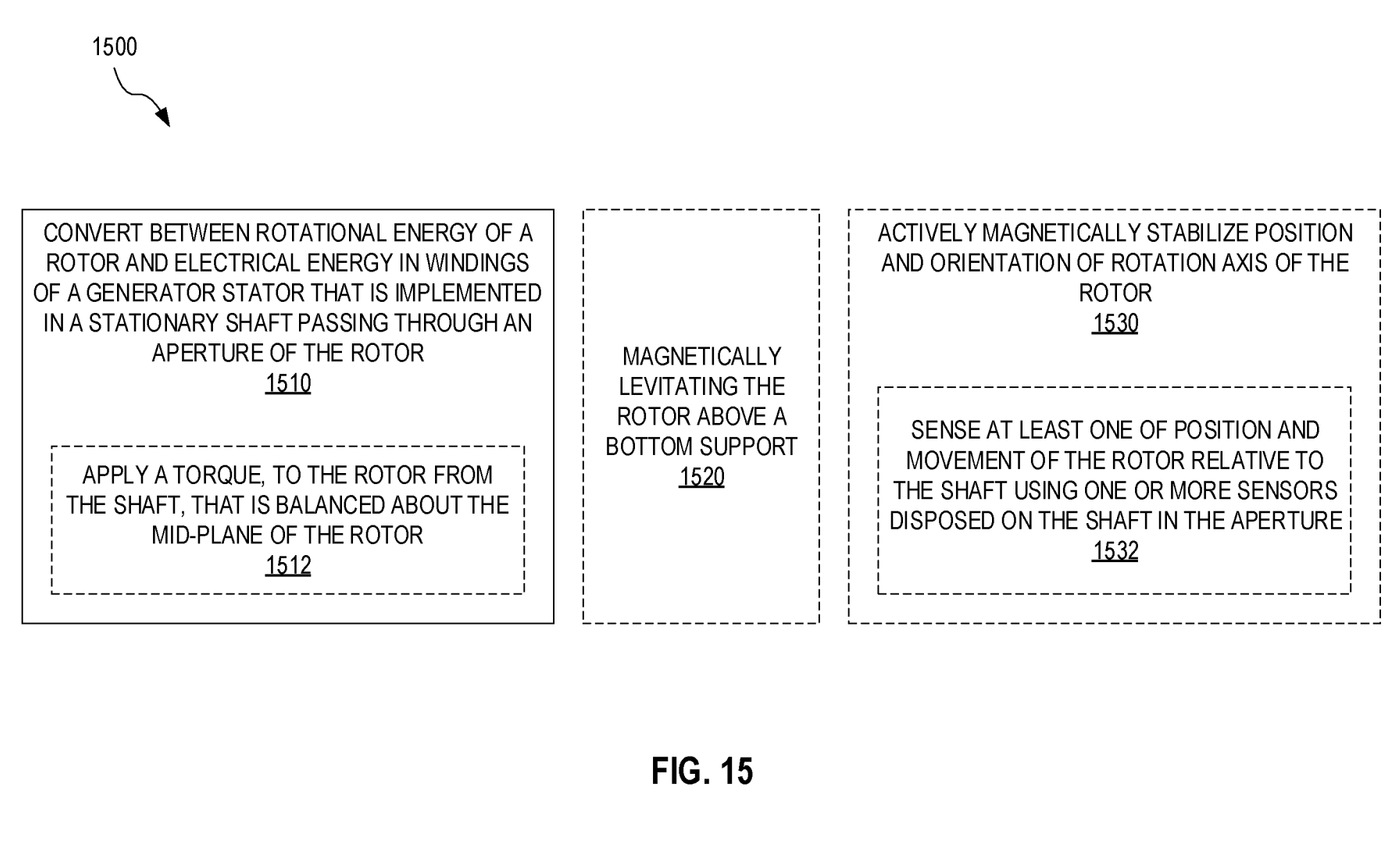
FIG. 15 illustrates one method for operating a flywheel system, according to an embodiment.

FIG. 15 illustrates one method 1500 for operating a flywheel system. A step 1510 converts between rotational energy of a rotor and electrical energy in windings of a generator stator that is implemented in a stationary shaft passing through an aperture of the rotor. In one example, step 1510 is performed by one or more generator modules 730 implemented in flywheel system 100. Step 1510 may include a step 1512 of applying a torque, to the rotor from the shaft, that is balanced with respect to the mid-plane of the rotor, at least to within fifteen percent. In one example of step 1512, one or more generator modules 730 of flywheel system 700 apply a balanced torque to rotor 110 to accelerate or decelerate rotor 110.

Method 1500 may further include a step 1520 of magnetically levitating the rotor above a bottom support. Step 1520 may be performed by bottom magnetic levitation module 1030. Optionally, method 1500 includes a step 1530 of actively magnetically stabilizing position and orientation of rotation axis of the rotor. In one example of step 1530, active magnetic bearing modules 1230 stabilize rotor 110. Step 1530 may include a step 1532 of sensing at least one of position and movement of the rotor relative to the shaft using one or more sensors disposed on the shaft in the aperture. One or more sensors 1232 may perform step 1532.

Figure 16:
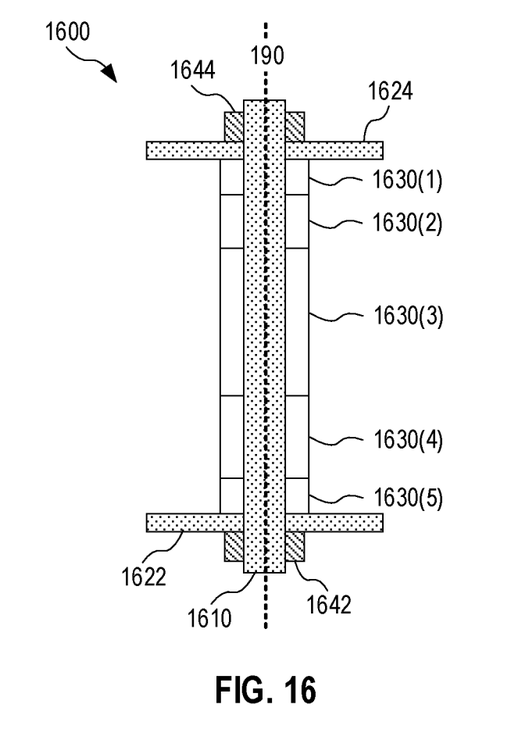
FIG. 16 is a cross-sectional view of a shaft assembly including a clamped stack of modules, according to an embodiment.

FIG. 16 is a cross-sectional view of one shaft assembly 1600 including a clamped stack of modules. Shaft assembly 1600 may be implemented in any of flywheel systems 100, 700, 800, 900, 1000, 1200, 1300, and 1400. Each of these flywheel systems has a stationary shaft. This stationary shaft may include different types of materials and therefore not be monolithic. For example, a portion of the shaft accommodating magnets or electromagnets of one type of magnetic module (e.g., generator module 730) may be composed of a different material than a portion of the shaft accommodating magnets or electromagnets of another type of magnetic module (e.g., active magnetic bearing module 1230) in order for these different types of magnetic modules to perform as desired. Thus, shaft assembly 1600 includes a plurality of stacked modules 1630. Each of at least some of stacked modules 1630 has magnetic functionality and includes one or more magnets or electromagnets. FIG. 16 shows five stacked modules 1630. However, it is understood that the number of stacked modules 1630 in shaft assembly 1600 may be greater or smaller than that depicted in FIG. 16.

Shaft assembly 1600 further includes a central rod 1610, a bottom support 1622, a top support 1624, a bottom pre-tensioning nut 1642, and a top pre-tensioning nut 1644. Each of stacked modules 1630, bottom support 1622, and top support 1624 forms an aperture. Central rod 1610 passes through these apertures. Bottom pre-tensioning nut 1642 is affixed (e.g., threaded) to a bottom end of central rod 1610, and top pre-tensioning nut 1644 is affixed (e.g., threaded) to a top end of central rod 1610, such that stacked modules 1630, bottom support 1622, and top support 1624 are clamped between pre-tensioning nut 1642 and pre-tensioning nut 1644. Pre-tensioning nuts 1642 and 1644 are tensioned to press together stacked modules 1630, bottom support 1622, and top support 1624, i.e., add contact pressure at the interfaces in the stack of stacked modules 1630, bottom support 1622, and top support 1624. Pre-tensioning nuts 1622 and 1624 thereby improve the bending stiffness of the stacked structure and, as a result, increase the lowest resonance frequencies of a flywheel system incorporating shaft assembly 1600.

As an alternative to using pre-tensioning to increase contact pressure between stacked modules 1630, bottom support 1622, and top support 1624, improved bending stiffness may be achieved by increasing the diameter of shaft assembly 1600. However, this would require increasing the diameter of rotor 110 as well, thus affecting its energy storage capacity. The pre-tensioning of shaft assembly 1600 achieves high bending stiffness without affecting the energy storage capacity of rotor 110.

Central rod 1610 may be solid or hollow. Bottom support 1622 may be an embodiment of bottom support 122 or part of bottom support 122. Top support 1624 may be an embodiment of top support 124 or part of top support 124. Without departing from the scope hereof, one of bottom pre-tensioning nut 1642 and top pre-tensioning nut 1644 may be integrally formed with central rod 1610.

Figure 17A:
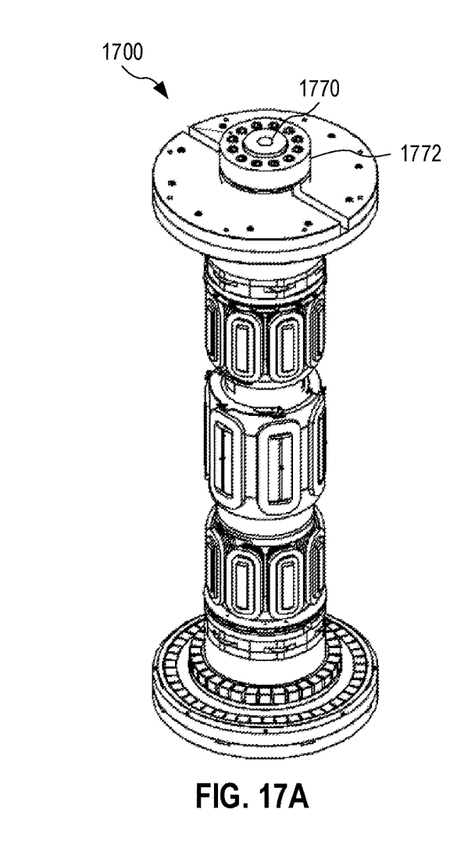
FIGS. 17A-C illustrate another shaft assembly, according to an embodiment.
Figure 17B:
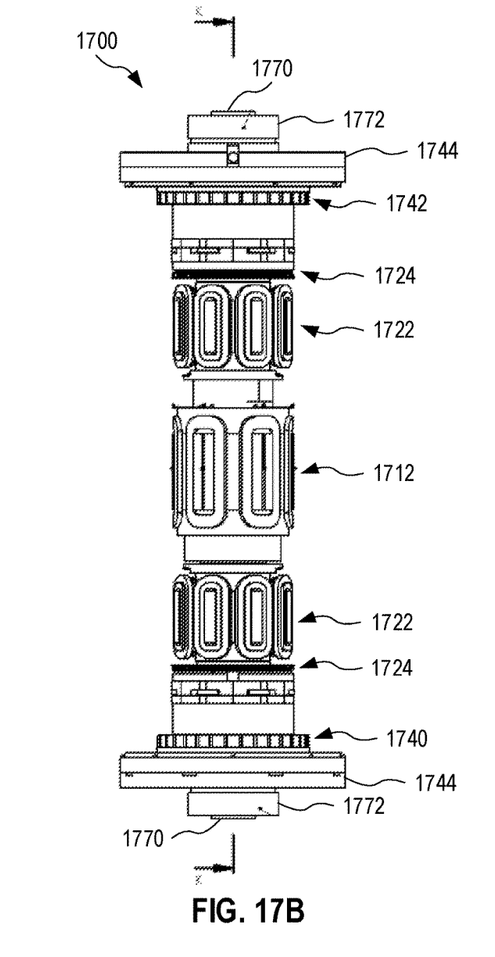
Figure 17C:
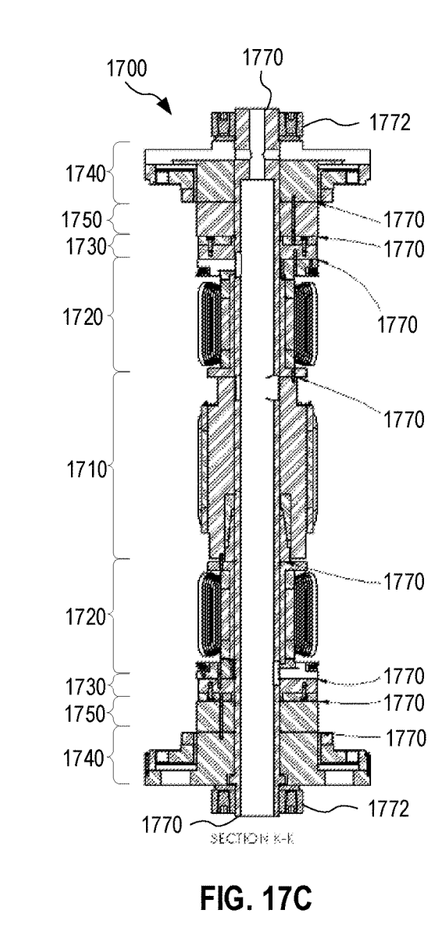

FIGS. 17A-C illustrate a shaft assembly 1700 that is an example of shaft assembly 1600. FIG. 17A is a perspective view of shaft assembly 1700, FIG. 17B is a side view of shaft assembly 1700, and FIG. 17C is a sectional view of shaft assembly 1700. FIGS. 17A-C are best viewed together in the following description. Shaft assembly 1700 includes a central rod 1770 (an example of central rod 1610), two end supports 1744 (examples of bottom support 1622 and top support 1624), two pre-tensioning nuts 1772, a set of electromagnets 1712 (embodiments of electromagnets 720, for example), two sets of electromagnets 1722 (embodiments of electromagnets 730, for example), two electromagnets 1724 (embodiments of electromagnets 1420, for example), and two sets of permanent magnets 1742. Electromagnets 1712 are integrated in a module 1710. Each set of electromagnets 1722 is integrated in a respective module 1720 together with a respective set of electromagnets 1724. Each set of permanent magnets 1742 is integrated in a respective module 1740 together with a respective end support 1744. Shaft assembly 1700 further includes two modules 1750 and two modules 1730. Modules 1710, 1720, 1730, 1740, and 1750 are examples of modules 1630. Modules 1710, 1720, 1730, 1740, and 1750 are stacked between pre-tensioning nuts 1772, with central rod 1770 passing through modules 1710, 1720, 1730, 1740, and 1750 and pre-tensioning nuts 1772. Pre-tensioning nuts 1722 are tensioned to press together the stack of modules 1710, 1720, 1730, 1740, and 1750 to impose contact pressure at interfaces 1770 therebetween, so as to optimize the bending stiffness of shaft assembly 1700.

Combinations of Features

Features described above as well as those claimed below may be combined in various ways without departing from the scope hereof. For example, it will be appreciated that aspects of a flywheel system, or associated method, described herein may incorporate or swap features of another flywheel system, or associated method, described herein. The following examples illustrate possible, non-limiting combinations of embodiments described above. It should be clear that many other changes and modifications may be made to the methods and device herein without departing from the spirit and scope of this invention:

(A1) A flywheel may include a rotor forming an aperture, and a fixture including a bottom support, a top support, and a shaft connecting the bottom support to the top support, wherein the shaft passes through the aperture, wherein the bottom support and the top support are outside opposite ends of the aperture, and wherein the rotor is configured to rotate about the shaft.

(A2) The flywheel system denoted as (A1) may further include a generator stator implemented with the shaft, and a plurality of first permanent magnets mechanically coupled to the rotor and configured to cooperate with the generator stator to convert between rotational energy of the rotor and electric current in windings of the generator stator.

(A3) The flywheel system denoted as (A1) may be configured to operate with the shaft being substantially vertical, and the flywheel system may further include a magnetic levitation module configured to support a gravitational load of the rotor, and the first permanent magnets and the generator stator may be cooperatively configured such that torque exerted by the generator stator on the rotor is balanced, to within fifteen percent, with respect to a mid-plane of the rotor orthogonal to its rotation axis.

(A4) The flywheel system denoted as (A2) may be configured to operate with the shaft being substantially vertical, and the flywheel system may further include a magnetic levitation module configured to support gravitational load of the rotor, and positions of the windings along the shaft may be symmetric, to within fifteen percent, about a first heightwise position that coincides with a mid-plane of the rotor orthogonal to its rotation axis.

(A5) In the flywheel system denoted as (A4), the windings may include a plurality of coils disposed at different respective azimuthal angles relative to the shaft and centered at the first heightwise position.

(A6) In either of the flywheel systems denoted as (A4) and (A5), the windings may include (a) a plurality of upper coils disposed at different respective azimuthal angles relative to the shaft and centered at an upper heightwise position that is above the first heightwise position, and (b) a plurality of lower coils disposed at different respective azimuthal angles relative to the shaft and centered at a lower heightwise position that is below the first heightwise position.

(A7) In the flywheel system denoted as (A6), distance from the upper coils to the first heightwise position may be the same as distance from the lower coils to the first heightwise position to within 15 percent.

(A8) In any of the flywheel systems denoted as (A4) through (A6), the magnetic levitation module may include (a) first load bearing magnets mechanically coupled with the rotor at a bottom surface of the rotor facing the bottom support, and (b) second load bearing magnets, mechanically coupled to the base, for magnetically coupling with the first load bearing magnets to magnetically levitate the rotor above the bottom support.

(A9) In the flywheel system denoted as (A8), each of the first and second load bearing magnets may be permanent magnets, and the second load bearing magnets may be configured to passively magnetically couple with the first load bearing magnets.

(A10) Any of the flywheel systems denoted as (A2) through (A9) may further include a plurality of stabilizer magnets mechanically coupled to the rotor, and a plurality of stabilizer electromagnets mechanically coupled to the fixture, wherein the plurality of stabilizer electromagnets are configured to magnetically couple with the plurality of stabilizer magnets to actively stabilize rotation axis of the rotor relative to the shaft.

(A11) In the flywheel system denoted as (A11), each of the stabilizer magnets may be a soft magnetic composite.

(A12) Either of the flywheel systems denoted as (A10) and (A11) may further include one or more sensors coupled to the shaft inside the aperture and configured to sense at least one of position and motion of the rotor relative to the shaft, to provide active feedback to the plurality of electromagnets.

(A13) Any of the flywheel systems denoted as (A10) through (A12) may further include a touch-down magnetic bearing system configured to stabilize the rotor relative to the fixture if the stabilizer electromagnets fail to stabilize the rotor.

(A14) Any of the flywheel systems denoted as (A8) through (A13) may further include a vertically stabilizing magnetic bearing system configured to actively stabilize vertical position of the rotor.

(A15) In the flywheel system denoted as (A14), the vertically stabilizing magnetic bearing system may include a plurality of second permanent magnets mechanically coupled to the rotor, and a plurality of electromagnets mechanically coupled to the shaft within the aperture and configured to magnetically couple with the second permanent magnets.

(A16) Any of the flywheel systems denoted as (A2) through (A15) may further include a coolant circulation circuit extending along at least a portion of the shaft to remove heat from the generator stator.

(A17) Any of the flywheel systems denoted as (A2) through (A16) may include a shaft assembly that implements the shaft. The shaft assembly includes a plurality of modules stacked between the bottom support and the top support. Each of at least some of the modules includes one or more electromagnets or magnets. The shaft assembly further includes (a) a central rod passing through an aperture of each of the stacked modules, the bottom support, and the top support, and (b) two pre-tensioning nuts affixed to the central rod to clamp the bottom support, top support, and modules between the pre-tensioning nuts.

(B1) A method for operating a flywheel system may include converting between rotational energy of a rotor and electrical energy in windings of a generator stator that is implemented in a stationary shaft passing through an aperture of the rotor, while the rotor is rotating about the shaft.

(B2) In the method denoted as (B1), the rotor may have a mid-plane orthogonal to its rotation axis, and the step of converting may include applying a torque to the rotor from the shaft, wherein the torque is balanced with respect to the mid-plane to within fifteen percent.

(B3) Either of the methods denoted as (B1) and (B2) may further include magnetically levitating the rotor above a bottom support, wherein the shaft extends upwards from the bottom support to a top support above the rotor.

(B4) Any of the methods denoted as (B1) through (B3) may further include actively magnetically stabilizing position and orientation of rotation axis of the rotor.

(B5) In the method denoted as (B4), the step of actively magnetically stabilizing may include sensing at least one of position and movement of the rotor relative to the shaft using one or more sensors disposed on the shaft in the aperture.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A flywheel system comprising:
   a rotor forming an aperture,
   a fixture including a bottom support, a top support, and a shaft connecting the bottom support to the top support and being substantially vertical during operation,
   wherein the rotor is adapted for receiving the shaft and to be maintained between the bottom support and the top support for rotation about the shaft,
   at least one magnetic levitation module,
   at least one magnetic bearing module adapted to stabilize the rotor in radial relative to the shaft, and
   a generator module configured to magnetically convert rotational energy of rotor to an electrical energy output of flywheel system and, conversely, magnetically convert an electrical energy input to flywheel system to rotational energy of rotor,
   wherein the at least one magnetic levitation module is configured to support gravitational load of the rotor in axial direction of the shaft, and
   wherein the at least one magnetic bearing module is an active magnetic bearing module controlled by feedback from one or more sensors coupled to the shaft inside the aperture and configured to sense at least one of position and motion of the rotor relative to the shaft.

2. The flywheel system according to claim 1, wherein the generator module comprises a generator stator with a plurality of electromagnets implemented with the shaft, and a plurality of first permanent magnets mechanically coupled to the rotor, and wherein each electromagnet of the plurality of electromagnets includes one or more windings wrapped around a soft magnetic core, and wherein the generator module comprises one or more cables disposed on or in the stationary shaft for carrying electric current supplied to or extracted from the windings of the plurality of electromagnets.

3. The flywheel system according to claim 2, wherein the permanent magnets and the plurality of electromagnets are disposed at different azimuthal positions about rotation axis.

4. The flywheel system according to claim 2, wherein the flywheel is adapted to be operated in a generator mode and in a motor mode, wherein the generator module:
   in the generator mode, is adapted to output to an external load, an electric current generated in the windings of the plurality of electromagnets by decelerating the rotation of rotor by converting rotational energy of rotor to electric energy, and
   in the motor mode, is adapted to use an electric current supplied by an external source to the windings of the plurality of electromagnets, to accelerate the rotation of rotor by converting inputted electrical energy to rotational energy of rotor.

5. The flywheel system according to claim 2, wherein the generator module comprises a liquid cooling circuit adapted for cooling the plurality of electromagnets.

6. The flywheel system according to claim 1, wherein the at least one magnetic levitation module comprising:
   a first magnetic levitation module adapted for levitating the rotor above the bottom support, and
   a second magnetic levitation module adapted for limiting upwards movement of rotor toward the top support.

7. The flywheel system according to claim 6, wherein the first magnetic levitation module comprises a first set of load bearing magnets mechanically coupled with the rotor at a bottom surface of the rotor facing the bottom support, and a set load bearing magnets mechanically coupled to the bottom support, for magnetically coupling with the first set load bearing magnets coupled with the rotor to magnetically levitate the rotor above the bottom support, and
   wherein the second magnetic levitation module comprises a second set of load bearing magnets mechanically coupled with the rotor at a top surface of the rotor facing the top support, and a set load bearing magnets mechanically coupled to the top support, for magnetically coupling with the second set load bearing magnets coupled with the rotor to magnetically limit upwards movement of rotor toward top support.

8. The flywheel system according to claim 6, wherein the generator module is symmetric about a mid-plane of the rotor to within fifteen percent of the axial dimension such that torque exerted by the generator stator on the rotor is balanced.

9. The flywheel system according to claim 1, wherein the generator module includes a plurality of coils centered at a mid-plane of the rotor, and wherein the at least one active magnetic bearing module includes
   a first active magnetic bearing module having a plurality of upper coils disposed at different respective azimuthal angles relative to the shaft and centered at a position in the aperture that is above the mid-plane of the rotor and closer to the top support, and
   a second active magnetic bearing module having a plurality of lower coils disposed at different respective azimuthal angles relative to the shaft and centered at a position in the aperture that is below the mid-plane of the rotor and closer to the bottom support.

10. The flywheel system according to claim 1, wherein the active magnetic bearing module comprises:
    a plurality of stabilizer magnets mechanically coupled to the rotor, and
    a plurality of electromagnets mechanically coupled to the fixture, the plurality of electromagnets being configured to magnetically couple with the plurality of stabilizer magnets to actively stabilize rotation axis of the rotor relative to the shaft.

11. The flywheel system according to claim 10, wherein each of the stabilizer magnets comprises a soft magnetic composite material.

12. The flywheel system according to claim 1, further comprising a touch-down magnetic bearing system configured to stabilize the rotor relative to the fixture if the active magnetic bearing module fails to stabilize the rotor.

13. The flywheel system according to claim 12, wherein the touch-down magnetic bearing system is a passive magnetic bearing module based on permanent magnets.

14. The flywheel system according to claim 1, and further comprising at least one touch-down magnetic bearing modules for stabilizing the rotor in the event of failure of one or more of active magnetic bearing modules, wherein the at least one touch-down magnetic bearing modules include at least one of the following:
    an upper touch-down magnetic bearing module positioned at the top end of the rotor, and
    a lower touch-down magnetic bearing module positioned at the bottom end of the rotor.

15. The flywheel system according to claim 1, further comprising a vertically stabilizing magnetic bearing system configured to actively stabilize vertical position of the rotor.

16. The flywheel system according to claim 15, wherein the vertically stabilizing magnetic bearing system comprises active axial stabilization modules controlled by feedback from the one or sensors and being arranged above and below the generator module and being configured to actively stabilize the position of rotor in an axial dimension.

17. A flywheel system comprising:
  a fixture including a bottom support, a top support, and a shaft connecting the bottom support to the top support and being substantially vertical during operation,
  a rotor adapted for rotation about the shaft,
  a generator module configured to, in a generator mode, magnetically convert rotational energy of rotor to an electrical energy and, in a motor mode, magnetically convert an electrical energy to rotational energy of rotor,
  a first magnetic levitation module adapted for levitating the rotor above bottom support,
  a second magnetic levitation module adapted for limiting upwards movement of rotor toward top support,
  one or more sensors coupled to the shaft inside an aperture of the rotor and configured to sense at least one of position and motion of the rotor relative to the shaft, and
  at least one active magnetic bearing module controlled by feedback from the one or sensors and adapted to stabilize the rotor in radial relative to the shaft.

18. A method for operating a flywheel system, comprising:
  a fixture having a bottom support, a top support, and a shaft connecting the bottom support to the top support and being substantially vertical during operation,
  a rotor adapted for rotation about the shaft,
  a generator module;
  a bottom magnetic levitation module adapted for levitating the rotor above bottom support,
  a top magnetic levitation module adapted for limiting upwards movement of rotor toward top support,
wherein the method for operating the flywheel system comprises:
  operating the generator module in
    a generator mode, by magnetically converting rotational energy of the rotor to electrical energy, or
    a motor mode, by magnetically converting electrical energy to rotational energy of rotor,
  monitoring the rotation of the rotor by feedback from one or more sensors coupled to the shaft inside an aperture of the rotor and configured to sense at least one of position and motion of the rotor relative to the shaft, and
  stabilizing the rotor in radial direction relative to the shaft by at least one active magnetic bearing module controlled by the one or sensors.

* * * * *